United States Patent [19]
Kotzin

[11] Patent Number: 5,627,830
[45] Date of Patent: *May 6, 1997

[54] METHOD AND APPARATUS FOR TRANSMITTING INFORMATION FOR MULTIPLE INDEPENDENT USERS IN A COMMUNICATION SYSTEM

[75] Inventor: Michael D. Kotzin, Buffalo Grove, Ill.

[73] Assignee: Motorola, Inc., Schamburg, Ill.

[*] Notice: The term of this patent shall not extend beyond the expiration date of Pat. No. 5,288,029.

[21] Appl. No.: 40,790

[22] Filed: Mar. 31, 1993

Related U.S. Application Data

[63] Continuation of Ser. No. 485,408, Feb. 27, 1990, Pat. No. 5,228,029.

[51] Int. Cl.$^6$ .................................................. H04J 3/16
[52] U.S. Cl. ..................... 370/336; 375/267; 455/56.1; 370/350
[58] Field of Search .................... 370/95.1, 95.3, 370/85.2, 105.1, 50.1, 94.1, 57, 104.1, 108, 18; 375/40, 38, 200, 211, 202, 203; 455/56.1, 59, 33.2; 379/60

[56] References Cited

U.S. PATENT DOCUMENTS

| | | | |
|---|---|---|---|
| 3,433,899 | 3/1969 | Pfleiderer et al. | 370/6 |
| 3,652,803 | 3/1972 | Joel, Jr. | 370/6 |
| 3,778,715 | 12/1973 | Schmidt et al. | 370/104.1 |
| 4,349,914 | 9/1982 | Evans | 375/40 |
| 4,414,661 | 11/1983 | Karlstrom | 370/95 |
| 4,510,595 | 4/1985 | Glance et al. | 370/50 |
| 4,570,265 | 2/1986 | Thro | 455/59 |
| 4,726,050 | 2/1988 | Menich et al. | 379/60 |
| 4,800,560 | 1/1989 | Aoki et al. | 370/104.1 |
| 4,817,089 | 3/1989 | Paneth et al. | 370/95.1 |
| 4,901,307 | 2/1990 | Gilhousen et al. | 370/18 |
| 4,901,310 | 2/1990 | Ichiyoshi | 370/57 |
| 4,907,224 | 3/1990 | Scoles et al. | 370/85.2 |
| 4,914,649 | 4/1990 | Schwendeman et al. | 370/50 |
| 5,088,108 | 2/1992 | Uddenfeldt et al. | 375/12 |
| 5,093,840 | 3/1992 | Schilling | 375/200 |
| 5,101,407 | 3/1992 | Harvey et al. | 370/95.3 |
| 5,109,390 | 4/1992 | Gilhousen et al. | 375/40 |
| 5,113,394 | 5/1992 | Kotzin | 375/211 |
| 5,127,100 | 6/1992 | D'Amico et al. | 455/33.1 |
| 5,128,925 | 7/1992 | Dornstetter et al. | 370/17 |
| 5,146,609 | 9/1992 | Tayloe et al. | 455/33.2 |
| 5,172,375 | 12/1992 | Kou | 370/95.3 |
| 5,179,559 | 1/1993 | Crisler et al. | 370/95.1 |
| 5,181,200 | 1/1993 | Harrison | 370/95.1 |
| 5,203,010 | 4/1993 | Felix et al. | 455/33.2 |
| 5,212,689 | 5/1993 | Eriksson | 370/95.1 |
| 5,228,029 | 7/1993 | Kotzin | 370/95.1 |
| 5,278,892 | 1/1994 | Bolliger et al. | 379/60 |
| 5,293,380 | 3/1994 | Kondo | 455/33.2 |
| 5,425,049 | 6/1995 | Dent | 370/95.1 |

OTHER PUBLICATIONS

ETSI/TC GSM Relesed by: ETSI/PT 12; Release Date Jan. 1990 Release Note Recommendation GSM 05.03 Channel Coding, previous released version: 3.5.0 new released version 3.5.1.

ETSI/TC GSM Released by: ETSI/PT 12, Release date: Jan. 1990, Release Note Recommendation 06.10, GSM full–rate speech transcoding, previous released version: 3.2.0 New released version 3.2.0.

ETSI/TC GSM Released by: ETSI/PT 12, Release date: Jan. 1991, Release Note Recommendation GSM 05.10, Radio Sub–system Synchronization, previous released version 3.4.0, new released version 3.5.0.

*Primary Examiner*—Douglas W. Olms
*Assistant Examiner*—Shick Hom
*Attorney, Agent, or Firm*—Richard A. Sonnentag

[57] ABSTRACT

An RF cellular communication system employing offset frame synchronization between cells, any cell being omnidirectional or directional, such that a frame at one cell is offset by an integral number of frames from another cell; the system incorporating multiplexed speech transcoding of traffic channels from multiple cells while supporting stringent delay requirements. Offset frame synchronization for providing rapid mobile assisted handoff.

30 Claims, 3 Drawing Sheets

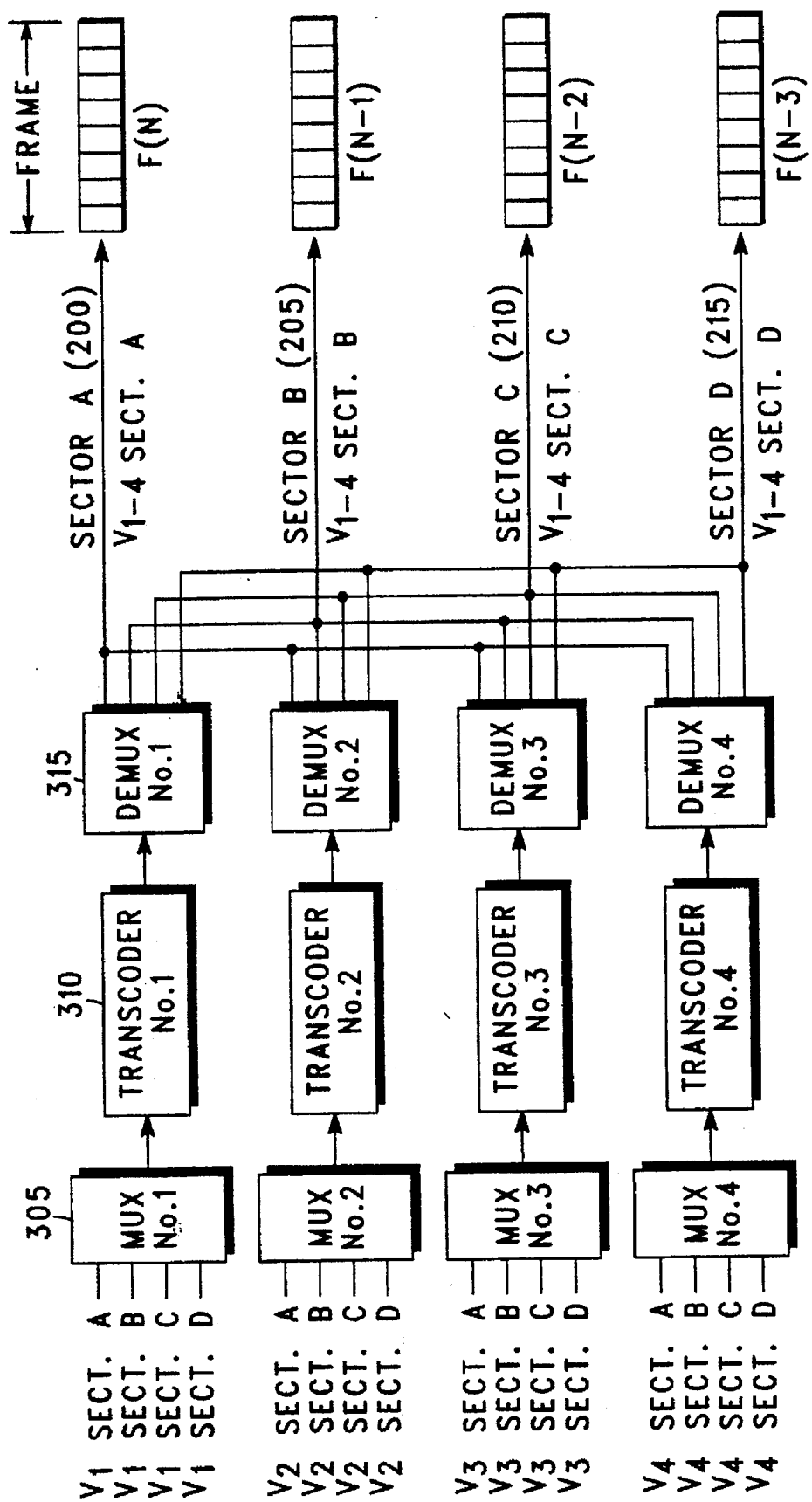

METHOD AND APPARATUS FOR TRANSMITTING INFORMATION FOR MULTIPLE INDEPENDENT USERS IN A COMMUNICATION SYSTEM

This application is a continuation of application Ser. No. 07/485,408 filed Feb. 27, 1990 and now U.S. Pat. No. 5,228,029.

TECHNICAL FIELD OF INVENTION

The invention relates generally to radio frequency (RF) communication systems and more particularly to RF cellular systems utilizing multiplexed carriers.

BACKGROUND OF THE INVENTION

RF digital cellular systems utilizing multiplexed carriers offer distinct advantages over analog cellular systems in both performance and subscriber capacity. A typical RF digital cellular system divides a given carrier frequency into identifiable time frames which comprise multiple time slots wherein each slot contains the digitized and coded speech (or data) for one traffic channel (one voice). This is referred to as a time division multiplexed (TDM) carrier. Therefore, one carrier frequency may accommodate multiple traffic channels. The Groupe Special Mobile (GSM) Pan-European cellular system, as specified in GSM recommendations available from the European Telecommunications Standards Institute (ETSI) and incorporated herein by reference, is such a digital cellular system. As typical with conventional cellular systems, the GSM system relies on geographic reuse of frequencies to achieve the large subscriber capacities. The use of reuse clusters involving various antenna configurations and patterns is well known. In the GSM terminology, the concept of a cell involves radio service to particular geographic area, and is not related to the location of the equipment. Thus, various sectors of an antenna comprise different GSM cells.

The GSM system requires frame synchronization for all carriers used in the same cell, i.e. a frame of one carrier frequency must be synchronized with a frame of all of the other carrier frequencies transmitted from that same cell. This ensures the ability of establishing the frame number for all the carriers of the cell based on information from a single carrier which provides this information, called the BCCH carrier. Each cell site uses a plurality of substantially identical multiframe signalling structures on multiple carriers and each carrier is assigned, at most, 8 voices or traffic channels. FIG. 1 illustrates typical GSM timing for one carrier. Each frame (100) contains 8 slots (S1–S8) with each slot representing one voice channel. In addition, GSM requires that a given TDM frame (100) must have slots which have the same representative coded information from each input voice, that is the constituents (algorithmic entities) of information for all users (slots) within a frame is essentially identical. The requirement of substantial identify of information within slots of a frame provides that each voice channel represent a frame number dependent communication resource for each user of the system.

For example, a given frame (100) must contain the same real time portion of speech coded information from each voice for each slot. Here, a 20 msec block of raw speech is taken from each of the traffic channels (105) and sampled at 8000 Hz A-law PCM and then transcoded (110) (essentially low bit rate encoded) by digital signal processors (DSP's) using RPE-LPC/LTP (the GSM specified speech coder technique), or other suitable coding technique. The transcoded speech for each 20 msec block then undergoes redundant coding (115) via convolutional coding techniques and is then partitioned and interleaved in slots (100) forming the coded speech bursts. This process is done for each of the 8 traffic channels. Since there is a stringent delay specification between the time a raw speech block is sampled to when transcoding by the DSP is to begin, one digital signal processor is required for each traffic channel.

A TDM system that requires same frame synchronization (Frame 1 of any cell is synchronized with the Frame 1 of all cells) between all surrounding cells, to produce a method of rapid handoffs between the subscriber and an adjacent cell. The knowledge of this synchronization by the subscriber allow him to determine his absolute distance from the target cell and adjust his transmissions accordingly to minimize any handover interruption.

However, using asynchronous, or particularly the frame synchronous TDM system, as generally described above, creates numerous problems affecting overall system performance, cost, layout, and reliability, particularly in the base sites or switch centers where the speech transcoding takes place and the framing is controlled. Requiring the same algorithmic outputs from exactly overlapping real time portions of each voice to occupy the same frame, combined with requiring restrictive timing delays for the transcoders necessitates providing one DSP for each traffic channel (voice).

This compels the need for 8 DSP's for each carrier used. Requiring such substantial numbers of DSP's directly impacts cell and base site layout (size of cages to house these devices and supporting circuitry) complexity, cost, and performance.

Another problem concerns worst case handoff latency in the same frame synchronization system. The existing GSM system uses a broadcast control channel (BCCH) to communicate control and access information to all subscribers units within its geographical receiving area. Handoff latency is measured as the time it takes for a subscriber to synchronize to and decode adjacent cell (potential destination cells for the handoff) BCCH carrier identifications. The BCCH bursts needed to accomplish this occur relatively infrequently in time. Delay in this process has the potential of causing audio degradation and dropped calls. Although the subscriber unit in such a system typically assists in the handoffs by monitoring the signal strength or distance of surrounding cells and maintains a table of the best candidates, typically, the subscriber unit can only decode this information during an idle frame which occurs every multiframe. With all surrounding cells synchronized, the BCCH identification for all adjacent cells is always transmitted at the same time. Therefore the subscriber only receives the BCCH identification from any adjacent cell after a sizeable delay due to the need to have the signalling multiframe slide significantly relative to the traffic multiframe.

Accordingly, there exists a need for an RF cellular TDMA communication system that provides efficient speech transcoding for multiple traffic channels and also improves handoff latency.

SUMMARY OF THE INVENTION

These needs and others have been substantially met through the cellular TDM communication system employing offset frame synchronization disclosed below. The invention comprises providing a TDM frame for at least a first carrier, and providing a corresponding TDM frame for at least a second carrier, and offsetting the TDM frames for the at least first carrier from that of the at least second carrier by a predetermined time. As particularly applied to a cellular system, that system includes providing a first TDM frame for at least a first cell's carrier, wherein a cell is omni-directional or directional, and also providing a first TDM frame for at least a second cell's carrier, and offsetting the TDM frames for the at least first cell's carrier from that of the second cell's carrier by a predetermined time.

The frames are offset by an integral number of frames such that frame timing for the first cell is advanced to that of the second cell. Traffic channel streams for the first and second carriers are multiplexed into the sequential transcoding means, such as a DSP, resulting in TDM slots of transcoded channels for each of the carriers. The DSP transcodes the traffic channels on a first in first out basis, and routes the transcoded channel associated with the first carrier to the first sector, and routes the transcoded channel associated with the second carrier to the second sector thereby reducing original processing complexity by facilitating substantially continuous transcoding of multiple traffic channel information streams.

The subscriber unit can determine the frame number of the neighboring sectors and cells thereby facilitating a more effective rapid handoff. Offsetting the frames allows the subscriber unit to synchronize and decode on a more continuous basis thereby reducing measurement latency delay.

BRIEF DESCRIPTIONS OF THE DRAWINGS

FIG. 3 generally depicts one embodiment implementing offset frame synchronization for a base site controlling four directional cells (sectors).

BEST MODE OF OPERATION

Figure 1:
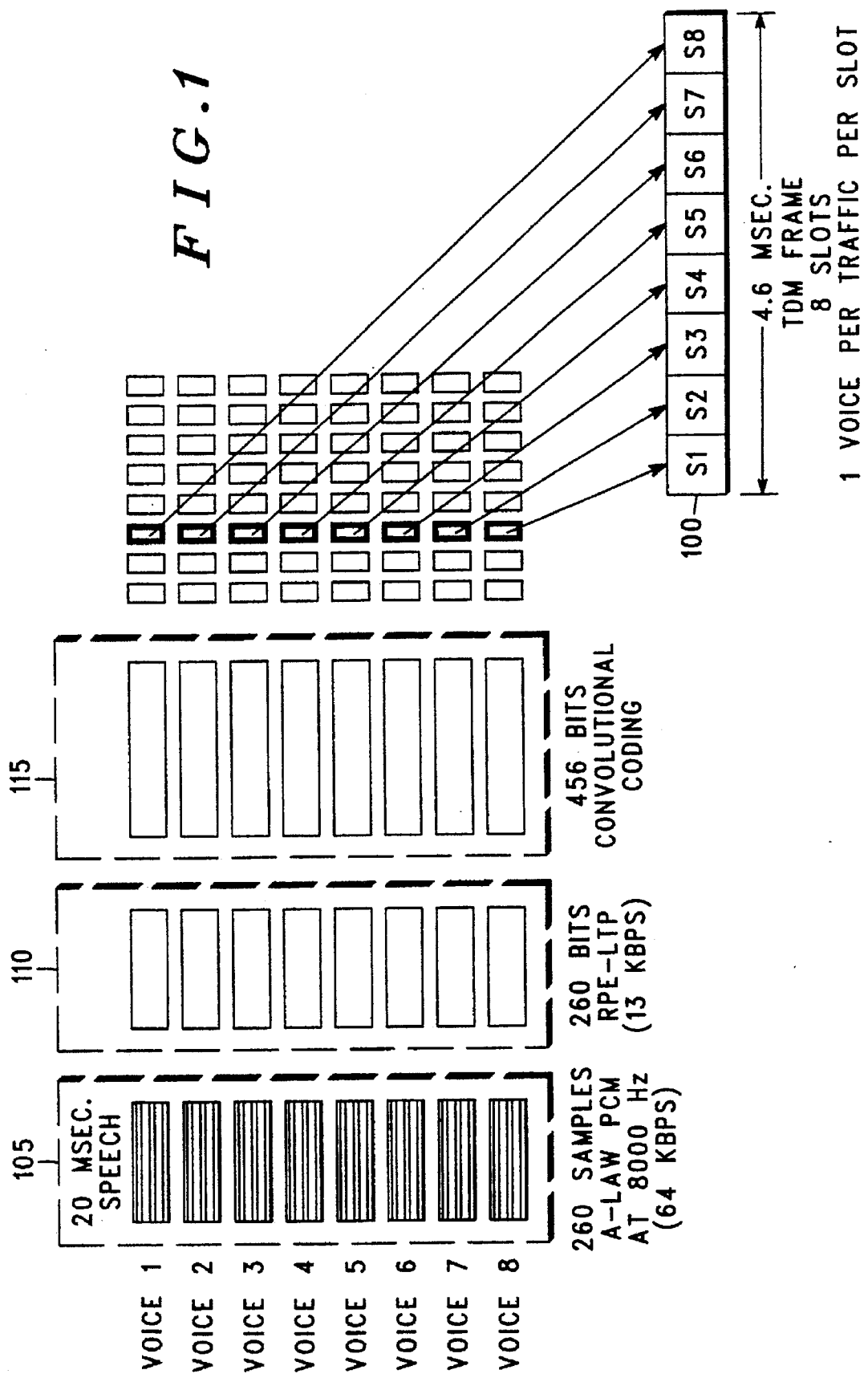
FIG. 1 illustrates the transformation of 20 msec. blocks of uncoded speech for each of eight traffic channels assigned to one carrier per the GSM specifications.
Figure 2:
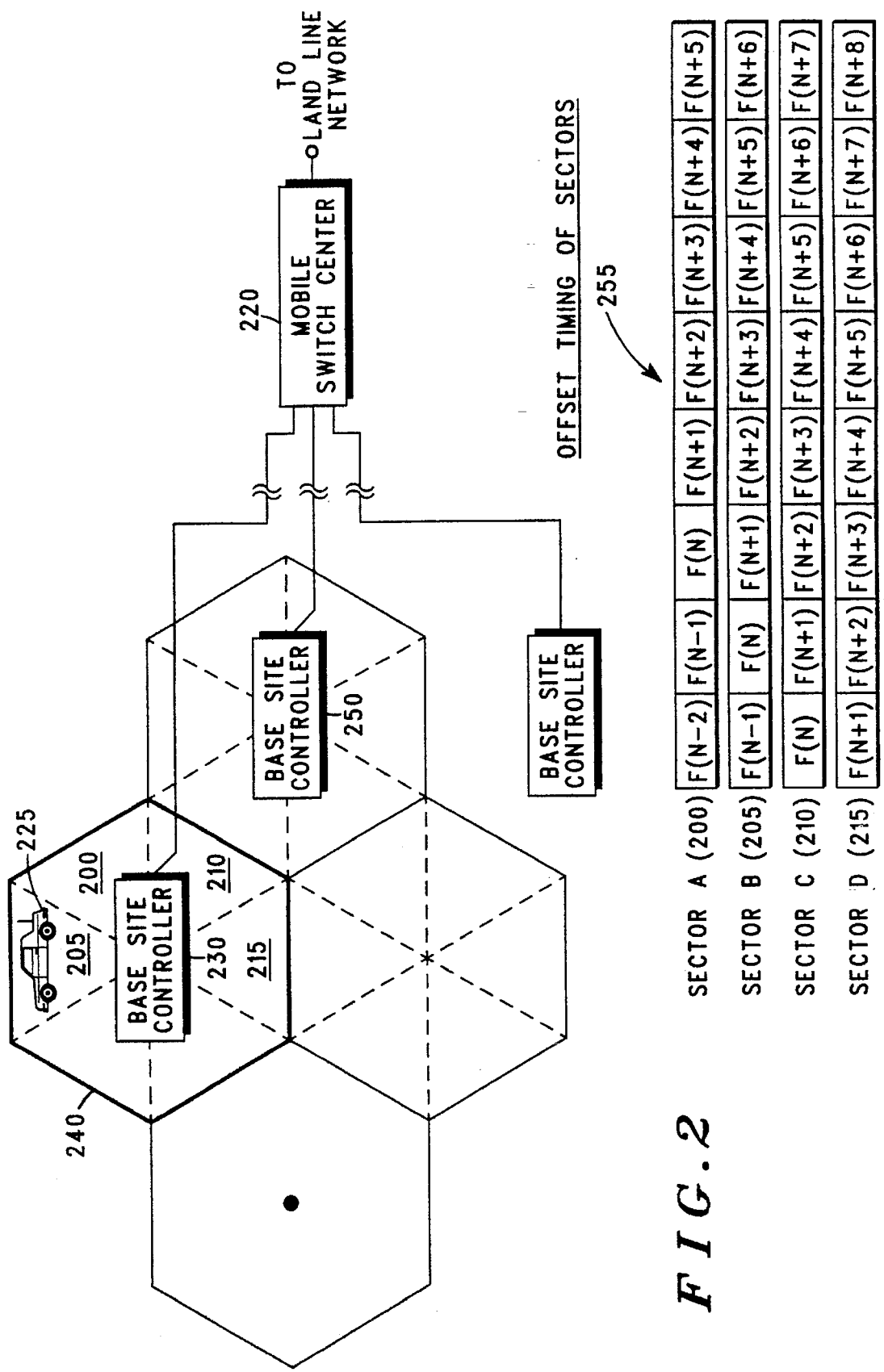
FIG. 2 depicts an RF cellular communication system using TDM carriers having offset frame synchronization in accordance with the invention.

FIG. 2 illustrates offset frame timing in accordance with the invention. A cellular system using time division multiplexed carriers and substantially identical signalling structures contains a number of service coverage areas including multiple six sectored cells (240–243) and if appropriate, one or more omni-directional cells (235). A base site controller (BSC) (230), providing a common reference, controls multiple sectors in cell 240 and the omni-directional cell (235) and is coupled to a mobile switching center (220) which interfaces with the landline network. Similarly, base site controller 250 controls the sectors of multiple cells 241 and 242. Cell site 240 contains at least Sectors A–D. Sector A (200) is adjacent to Sector B (205) and Sector C (210), and Section D (215) is adjacent to Sector C (210). A subscriber unit (225) is shown within the geographic coverage area of Section B (205) in cell 240. At least one subscriber unit (225) monitors the signal strength from neighboring cells, which includes decoding the neighboring cell's BCCH identification information, typically to effectuate a mobile assisted handoff.

Offset frame synchronization (255) is depicted for one carrier in each of the four sectors. Because same frame synchronization is required for each carrier within a sector, one carrier per sector will be used merely to better facilitate discussion, however, as obvious to one skilled in the art, the invention readily applies to sectors using multiple carriers. The time frames, including their respective slots, and bursts, are taken to be equivalent to those specified in GSM recommendation 5.01 (draft 3.1.0.). Frame identification is straightforward in GSM, as a number counter is defined whose value distinctly defines the timing contents of the particular frame under an algorithmic operation such as that specified in GSM Recommendation 6.10. Frame F(N) is the initial timing frame corresponding to a first frame, i.e. Frame 1, F(N+1) corresponds to the next frame in sequence and F(N−1) corresponds to the previous frame from F(N). Frames between sectors are staggered in time by an integral number of frames. Here the offset is shown to be one frame. Therefore, Frame 1 of Sector A (200) is offset by one frame from Section B (205) and Frame 1 of Sector C (210) is offset from Sector B (205) by one frame and Sector D (215) is offset by one frame from Sector C (210). Consequently, Sector A frame timing is advanced by three frames to that of Sector D.

Offset frame synchronization (255) is controlled by each of the BSC's (230 and 250) each providing a common reference for their respective sectors. The BSC's (230 and 250) provide such offset synchronization by control of the frame number used in transcoding communicated signals for their respective sectors. Offset synchronization, in accordance with the preferred embodiment, is determined by the BSC's (230 and 250) through calculation of a sector frame number (N+a) for each frame (N), where a is a constant representing an offset value for the sector. The common reference of each BSC (230 and 250) is controlled by the MSC (220) in establishing an offset among BSC's (230 and 250). Unlike a same frame synchronization system, speech transcoding does not require the use of one DSP (transcoder means) per traffic channel. The invention takes into account the timing requirement of the TDM air interface and the type of traffic channel information packet required to be in the same frame, and dramatically reduces the cost and complexity of a BSC by allowing multiple traffic channels to be multiplexed into fewer DSP's.

FIG. 3 discloses one embodiment of the invention as applied to transcoding device located at a BSC. One of four traffic channels (V1–V4) from each sector (still assuming one carrier per sector as in FIG. 2) is input into a multiplexing stage (305). The traffic channel is output from the multiplexing stage (305) and operably coupled to the input of the transcoder (310) (DSP) wherein the chosen traffic channel is processed into a reduced bit rate signal. This processed signal is coupled to a demultiplexing stage (315) which serves to rout the processed traffic channel to the appropriate offset frame of the appropriate sector.

For example, each carrier for each Section (A–D) (FIG. 2) is assigned four traffic channels ($V_1$–$V_4$) such that Sector A (200) will communicate traffic channels ($V_1$–$V_4$)Sect. A, Sector B (205) will communication traffic channels ($V_1$–$V_4$) Sect. B, Sector C (210) will communicate traffic channels ($V_1$–$V_4$)Sect C, and Sector D (215) will communicate traffic channels ($V_1$–$V_4$)Sect D. Since GSM requires such a stringent delay requirement between the time raw data is available to when it must be processed, and since a given TDM frame (100) must include the same representative coded information from each input traffic channel assigned to that frame, all of the traffic channels $V_1$–$V_4$ Sect. A must be processed at substantially the same time. Similarly, all of the traffic channels $V_1$–$V_4$ Sect. B must be processed at substantially the same time and all of the traffic channels $V_1$–$V_4$ Sect. C must be processed at substantially the same time etc. However, offsetting the frame timing between sectors increases signal availability by allowing traffic channels $V_1$-$V_4$ Sect. A to be processed before the other sector's traffic channels since its frame timing is advanced by at least one frame to that of the other sectors.

Unlike same frame synchronization, not all traffic channels must be processed at the same time, therefore the system may stagger the generation of the traffic channel packets based upon sector frame separation. As seen from FIG. 3, a four fold reduction in the number of DSP's results (the DSP now processes four traffic channels from four different sectors as opposed to one DSP per traffic channel, as in the same frame synchronization system). As appreciated by those skilled in the art, further enhancement of speech transcoding may be effectuated depending upon numerous variables such as the rate of transcoding versus time allowed before transmission, frame offset duration, propagation delays between subsystems, and other variables. Further enhancements are obvious to those skilled in the art, such as using multiple input multiplexing and demultiplexing stages.

The offset frame TDM system is also used to substantially reduce handoff latency. In the GSM system, the subscriber knows what frame it is currently at and also compiles neighboring cell signal strength information for neighboring cells in every frame. Idle frames are provided to allow a subscriber to decode the BCCH identification from neighboring cells to confirm the source. In a same frame synchronized system, this decode operation provides synchronization information that allows the subscriber to establish its distance from the neighboring cell. In such same frame synchronized system, this offers the opportunity for the subscriber to effectuate a rapid handover, since a protocol to determine its distance before traffic transmission is avoided. An idle frame generally occurs once every predetermined number of frames of the multi-frame signalling structure.

As previously pointed out, with a same frame synchronization system, all BCCH identifications from neighboring cells are transmitted simultaneously. This frame alignment causes handoff latency since a subscriber, after decoding of a first BCCH ID, must wait a maximum period of time before a second can be decoded, allowed by the eventual signaling and traffic multiframes sliding relative to one another. With an offset frame synchronization system, for example, sectors from the same cell and the sectors from neighboring cells, will be offset in time. Consequently, the idle frames will occur on a staggered time basis. Therefore, the amount of time a subscriber unit must wait to decode all surrounding BCCH ID's, on the average, is dramatically reduced compared to the time he must wait if every time he just missed the next decode opportunity (the guaranteed case for same frame synchronization). The staggered frame system reduces the worst case idle frame waiting time by increasing the number BCCH signals available to subscriber units per multi-frame thereby substantially reducing handoff latency.

The base site offsets frame timing between the current sector and the handoff sector by a predetermined time, for the preferred embodiment, this time is one time frame such that the first slot from one frame overlaps the first slot of the second frame. The subscriber unit determines the offset frame timing difference between a frame received from a neighboring sector and that of the current sector using its knowledge of the serving cell's frame counter information and the frame counter information decoded from the neighboring cell's BCCH carrier. Once the frame number for the neighboring sectors in known, the subscriber in conjunction with his fine measurement of relative timing measurement a particular neighboring cell, can effectuate a rapid handoff, as defined for same frame synchronization. This is done by maintaining a look up table stored in the mobile.

In another embodiment, the subscriber unit further prioritizes its search of neighboring cell BCCH information based upon previously determined offsets of a plurality of neighboring cells, in order to minimize the time to acquire subsequent neighboring cell information. It was discovered that this technique was also advantageous in systems where offset was not intentionally controlled but let to operate with asynchronously (arbitrarily) offset cell timings.

As is obvious to one of ordinary skill in the art, the offset timing need not be constant from sector to sector and cell to cell as long as the subscriber unit may determine which frame number each sector is at or which offset timing is used by any sector. Partial benefits are possible by employing only part of the invention, for example using an approximately one third frame offset to achieve a 3:1 DSP device reduction for transcoding but ignoring any opportunity to provide rapid synchronization. In addition, combinations of same frame synchronization of some cells and offset frame synchronization may be beneficial in a given system.

What I claim is:

1. In a radio frequency communication system supporting a plurality of traffic channels, the traffic channel being framed so as to implement traffic channel frames, a method of transmitting information for multiple independent users comprising:

independently coding information from at least two of said multiple independent users to produce independently coded information for the at least two of said multiple independent users;

placing said independently coded information for the at least two of said multiple independent users into different traffic channel frames; and transmitting at least two of said traffic channel frames staggered by a time offset related to the traffic channel frame.

2. The radio frequency communication system of claim 1 wherein the traffic channel frames correspond to information inputs which are similarly offset in time.

3. In a radio frequency cellular communication system using carriers, having at least a first and second cell, each cell being assigned at least one carrier, a method of organizing independently coded frames comprising:

providing an independently coded frame for the at least first cell's carrier, providing a corresponding independently coded frame for the at least second cell's carrier; and staggering the independently coded frames for the at least first cell's carrier from that of the at least second cell's carrier by a predetermined time related to the independently coded frames.

4. The cellular communication system of claim 3 wherein the corresponding independently coded frame, for the at least second cell's carrier, comprises information whose content results from a substantially similar algorithmic operation also used to obtain information contained in the independently coded frame for the at least first cell's carrier.

5. The cellular communication system of claim 3 wherein the predetermined time related to the coded frames comprises a fraction of the independently coded frames.

6. In an RF communication system using carriers, having at least a first cell and at least one handoff cell, wherein either of the cells may be omni-directional or directional, each cell being assigned at least one carrier, and at least one subscriber unit communicating with the first cell, a system apparatus for synchronization comprising:

at least one base site controller including means for offsetting frame timing between the at least first cell and the at least one handoff cell by a predetermined time, and the at least one subscriber unit having;
i) means for determining the offset frame timing difference between a frame received from the at least one handoff cell and that of the at least first cell,
ii) means, operably coupled to means for determining, for establishing where information is expected in the frame received from the at least one handoff cell, and
iii) means, operably coupled to means for determining, for transferring from the carrier assigned to the at least first cell, to the carrier assigned to the handoff cell, without synchronizing to a specific frame number of the at least handoff cell thereby facilitating a rapid handoff.

7. The cellular system of claim 6 wherein the predetermined time comprises an integral number of frames.

8. The cellular system of claim 6 wherein the subscriber unit further comprises means for prioritizing a search based upon the frame number received from each of a plurality of neighboring cells to minimize the time to acquire subsequent neighboring cell information.

9. A subscriber unit for use in an RF cellular communication system having at least a first cell and handoff cell, wherein either of the cells may be omni-directional or directional, each cell being assigned at least one carrier, the subscriber unit comprising:

means for determining an offset frame timing difference between a frame received from the at least one handoff cell and that of the at least first cell, and means, operably coupled to means for determing, for establishing where information is expected in the frame received from the at least one handoff cell means, operably coupled to means for determining, for transferring from the carrier assigned to the at least first cell, to the carrier assigned to the handoff cell, without synchronizing to a specific frame number of the at least one handoff cell thereby facilitating a rapid handoff.

10. In a radio frequency communication system supporting a plurality of traffic channels, the traffic channel being framed so as to implement traffic channel frames, an apparatus for transmitting information for multiple independent users comprising:

means for independently coding information from at least two of said multiple independent users to produce independently coded information for the at least two of said multiple independent users;

means for placing said independently coded information for the at least two of said multiple independent users into different traffic channel frames; and means for transmitting at least two of said traffic channel frames staggered by a time offset related to the traffic channel frame.

11. The radio frequency communication system of claim 10 wherein the traffic channel frames correspond to information inputs which are similarly offset in time.

12. In a radio frequency cellular communication system using carriers, having at least a first and second cell, each cell being assigned at least one carrier, an apparatus for organizing independently coded frames comprising:

means for providing an independently coded frame for the at least first cell's carrier;

means for providing a corresponding independently coded frame for the at least second cell's carrier; and means for staggering the independently coded frames for the at least first cell's carrier from that of the at least second cell's carrier by a predetermined time related to the independently coded frames.

13. The method of claim 1 wherein the time offset is related to a fraction of the traffic channel frame.

14. The method of claim 1 wherein the information from each of said multiple independent users further comprises speech information from each of said multiple independent users.

15. The method of claim 1 wherein the step of transmitting occurs from a base site to at least two multiple independent users.

16. The method of claim 1 wherein the step of transmitting some of said traffic channel frames staggered by a time offset related to the traffic channel frame further comprises transmitting some of said traffic channel frames staggered, relative to one another, by a time offset related to the traffic channel frame.

17. The method of claim 1 wherein the step of transmitting some of said traffic channel frames staggered by a time offset related to the traffic channel frame further comprises the step of transmitting some of said traffic channel frames staggered, relative to a traffic channel frame having no time offset, by a time offset related to the traffic channel frame.

18. The apparatus of claim 10 wherein the time offset is related to a fraction of the traffic channel frame.

19. The apparatus of claim 10 wherein the information from each of said multiple independent users further comprises speech information from each of said multiple independent users.

20. The apparatus of claim 10 wherein the means for transmitting is located at a base site.

21. The apparatus of claim 10 wherein the means for transmitting some of said traffic channel frames staggered by a time offset related to the traffic channel frame further comprises means for transmitting some of said traffic channel frames staggered, relative to one another, by a time offset related to the traffic channel frame.

22. The apparatus of claim 10 wherein the step of transmitting some of said traffic channel frames staggered by a time offset related to the traffic channel frame further comprises transmitting some of said traffic channel frames staggered, relative to a traffic channel frame having no time offset, by a time offset related to the traffic channel frame.

23. In a radio frequency communication system having an air-interface structure supporting a plurality of traffic channels, the air-interface structure being framed such that the plurality of traffic channels are organized as traffic channel frames, the traffic channel frames containing information in the form of traffic channel packets, a method of transmitting the traffic channel packets to multiple independent users comprising:

staggering the generation of traffic channel packets to be transmitted to the multiple independent users to produce staggered traffic channel packets; and transmitting the staggered traffic channel packets to the multiple independent users.

24. The method of claim 23 wherein the generation of the traffic channel packets further comprises at least transcoding information from each of said multiple independent users.

25. The method of claim 24 wherein transcoding information from each of said multiple independent users further comprises transcoding speech information from each of said multiple independent users.

26. A method of transmitting information to multiple users in a wireless communication system, the wireless communication system implementing a base site which supports the transmission of traffic channel frames, the method comprising the steps of:

coding information for each of said multiple users to produce coded information for each of said multiple users;

placing a portion of said coded information for each of said multiple users into a traffic channel frame; and transmitting some of the traffic channel frames staggered by a time offset related to a fraction of the traffic channel frame.

27. The method of claim 26 wherein the information for each of said multiple users further comprises speech information for each of said multiple users.

28. A apparatus for transmitting information to multiple users in a wireless communication system, the wireless communication system implementing a base site which supports the transmission of traffic channel frames, the apparatus comprising:

means for coding information for each of said multiple users to produce coded information for each of said multiple users;

means for placing a portion of said coded information for each of said multiple users into a traffic channel frame; and means for transmitting some of the traffic channel frames staggered by a time offset related to a fraction of the traffic channel frame.

29. The apparatus of claim 28 wherein the information for each of said multiple users further comprises speech information for each of said multiple users.

30. The apparatus of claim 28 wherein the means for transmitting some of the traffic channel frames staggered by a time offset related to a fraction of the traffic channel frame further comprises means for transmitting some of the traffic channel frames staggered, relative to a frame having no time offset, by a time offset related to a fraction of the traffic channel frames.

* * * * *